UNITED STATES PATENT OFFICE.

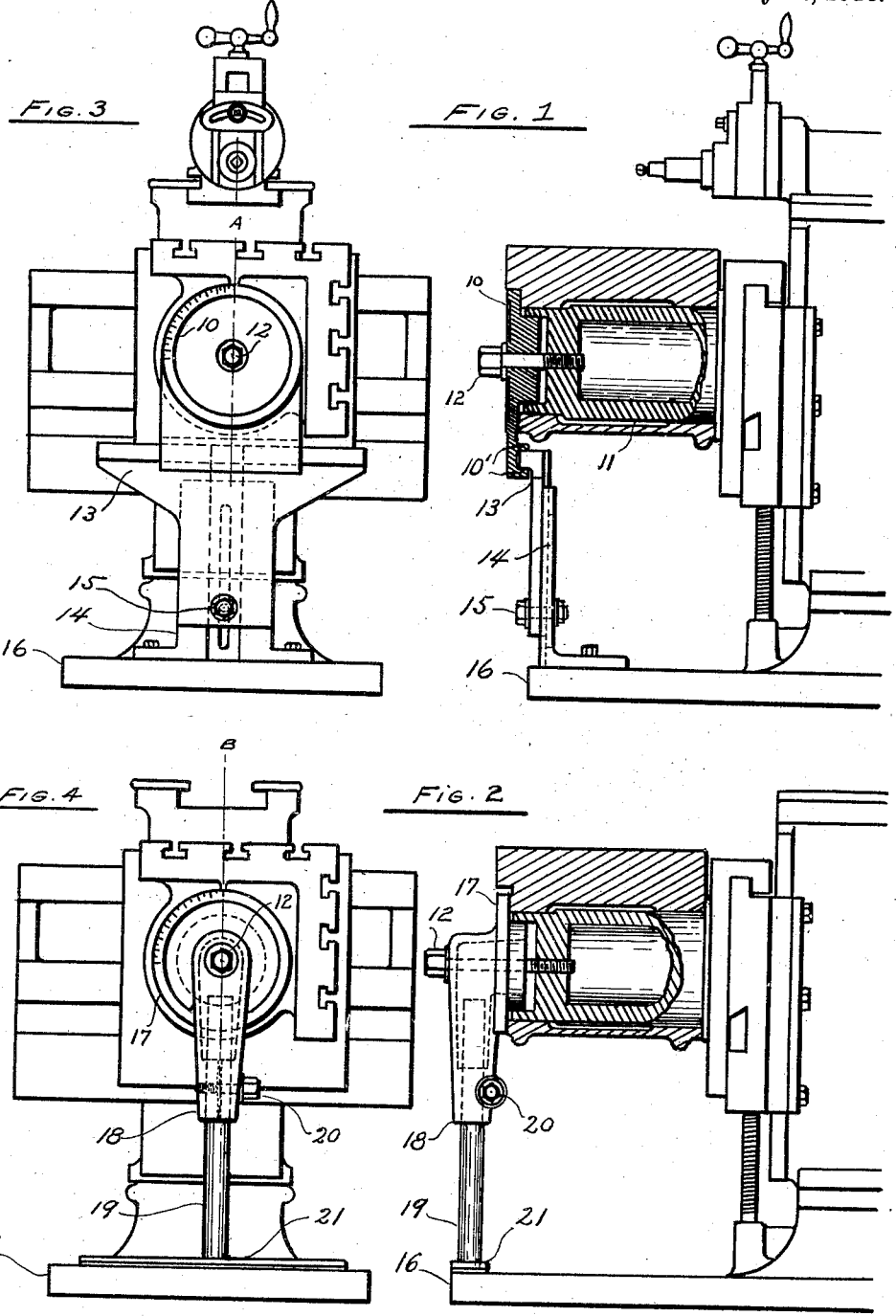

ERNEST B. SELLEW, OF PAWTUCKET, RHODE ISLAND.

SHAPING-MACHINE.

1,067,882.  Specification of Letters Patent.  Patented July 22, 1913.

Application filed May 27, 1912. Serial No. 700,116.

*To all whom it may concern:*

Be it known that I, ERNEST B. SELLEW, a citizen of the United States, residing at 51 Allen avenue, Pawtucket, in the county of Providence and State of Rhode Island, have invented certain new and useful Improvements in Shaping-Machines, of which the following is a specification.

This invention has reference to an improvement in the class of metal-working machines in which the cutting tool reciprocates over the work in order to plane or shape it into form when it is held in a fixed position upon the table or work-holder, and particularly to the cylindrical type of table shown on the class of machines patented May 8, 1900, No. 649175.

The object of this invention is to give to the table on a machine of the class described, a rigid support to resist the pressure of the tool or cutter brought upon the work by the cutting action, and therefore secure greater accuracy, as well as greater speed in doing the work.

The invention consists principally in the convenient construction of the table support, whereby the vertical adjustment to the table can be very quickly and easily made to accommodate that work and then be securely clamped so that the table may receive an efficient outboard support during its entire transverse feeding travel underneath the reciprocating tool.

The particular application of the outboard support is shown by the drawing as applied to a table or work-holder of a shaping machine in which—

Figure 1 is a side elevation of the front part only as the back of the machine which is not shown, is not a part of this invention and need not be described. The work holder portion of the machine is shown in section the same being taken at A on Fig. 3 which view is a front end elevation of the machine showing the work holder supported on a bearing which can be clamped in position after its vertical adjustment, said bearing being always a fixed distance under the top of the table in whatever vertical position the same may be adjusted. The table is of the swiveled type and has tangential flat sides provided with clamping slots by which the work may be clamped, as shown in the different figures. Figs. 2 and 4 show corresponding views to Figs. 1 and 3 respectively of an outboard support, of different construction however, the sliding bearing being clamped on the base of the machine which is extended toward the front to receive it. In Fig. 2 the table portion only of the machine is shown in section, said section being taken at B in Fig. 4.

Similar marks of reference indicate corresponding parts on all the figures.

On the drawing, 10 indicates a plate used for clamping the table at its outer end, in its position as shown, or, after being swiveled around on its trunnion 11 in any desired angular position. The clamping bolt 12, to accomplish the binding, draws said plate 10 into the trunnion 11, which has a counterbore at its outer end to receive a hub which projects from and is part of said plate 10. This plate 10 is provided with graduations as shown to determine the angular adjustment of the table. The lower portion of plate 10 is projected downward to make a U shaped connection 10′ to rest upon the bearing of the support arm 13. Said support 13 is vertically adjustable and is clamped to the stationary support 14, by the clamping bolt 15 which passes through a slot for it in the stationary support 14. The stationary support 14 is bolted to the extension of the machine base 16, which is projected toward the front of the machine to receive it.

In Fig. 2 the binder plate 17, which corresponds to the plate 10 in Fig. 1, is somewhat different in form, having a hub or hollow stem 18 projecting downward from its lower side, which telescopically receives a post 19, which, after it is in its proper vertical position, can be securely clamped by the binder bolt 20. The lower end of this post 19 rests upon a bearing surface 21 which is part of the extension of the machine base 16 as in the case of the construction of Fig. 1. The binder plate 17 is also clamped by the binder bolt 12 in the same manner as in the first mentioned construction.

In both forms of construction, it is to be noted that the same principle of adjustment between the support proper and the binder plate obtains. In Figs. 1 and 3 the connection between the binder plate 10 and the stationary support 14 is in two parts, namely the extension 10′ and the supporting arm 13, the latter being connected with the extension 10′ and adjustably connected with the support 14, so that in this construction the elements 10′ and 13 together constitute the extension which is adjustably connected to the stationary support 14. In the construction shown in Figs. 2 and 4, the extension 18 is projected down sufficiently far to afford for the same range of adjustment that is afforded by the employment of the two-part extension shown in Figs. 1 and 3.

Two desirable forms of construction of the table support are shown in combination with the swiveling type of table.

Having thus fully described and set forth my improvement, what I claim therein as new and of my invention, and desire to secure by Letters Patent, is,

1. The combination with a swiveled table, and a binder plate engaging the outer end of the table and having an extension projecting downwardly below the table, of a support connected with said extension, the support and extension adjustable vertically relative to each other.

2. The combination with a swiveled table having a bore in its outer end, and a binder plate having a hub received in said bore, an extension carried by said binder plate and projecting downwardly below the table, and a support connected with the extension and adjustable vertically with respect thereto.

In testimony whereof I affix my signature in presence of two witnesses.

ERNEST B. SELLEW.

Witnesses:
  ROSCOE M. DEXTER,
  EDITH M. BROMLEY.

Copies of this patent may be obtained for five cents each, by addressing the "Commissioner of Patents, Washington, D. C."